United States Patent
Honda

(10) Patent No.: US 8,621,557 B2
(45) Date of Patent: Dec. 31, 2013

(54) INFORMATION PROCESSING SYSTEM JUDGING WHETHER MANIPULATION IS POSSIBLE OR NOT BASED ON ACCESS CONTROL POLICY AND METHOD OF OPERATION THEREOF

(75) Inventor: Atsushi Honda, Tokyo (JP)

(73) Assignee: NEC Corporation, Tokyo (JP)

( * ) Notice: Subject to any disclaimer, the term of this patent is extended or adjusted under 35 U.S.C. 154(b) by 133 days.

(21) Appl. No.: 13/148,825

(22) PCT Filed: Feb. 12, 2010

(86) PCT No.: PCT/JP2010/052033
§ 371 (c)(1),
(2), (4) Date: Aug. 10, 2011

(87) PCT Pub. No.: WO2010/095561
PCT Pub. Date: Aug. 26, 2010

(65) Prior Publication Data
US 2011/0321121 A1    Dec. 29, 2011

(30) Foreign Application Priority Data
Feb. 17, 2009    (JP) .................................. 2009-034528

(51) Int. Cl.
G06F 17/00    (2006.01)

(52) U.S. Cl.
USPC ............................................................. 726/1

(58) Field of Classification Search
USPC ......................................... 726/16, 21, 26–30
See application file for complete search history.

(56) References Cited

U.S. PATENT DOCUMENTS

| 6,754,212 | B1 * | 6/2004 | Terada et al. ................. 370/389 |
| 7,013,332 | B2 * | 3/2006 | Friedel et al. ................. 709/223 |
| 7,441,265 | B2 * | 10/2008 | Staamann et al. ................. 726/4 |
| 7,774,830 | B2 * | 8/2010 | Dillaway et al. ................. 726/9 |

(Continued)

FOREIGN PATENT DOCUMENTS

| JP | 2002091816 A | 3/2002 |
| JP | 2004152295 A | 5/2004 |

(Continued)

OTHER PUBLICATIONS

Moffett, Jonathan et al., "Specifying Discretionary Access Control Policy for Distributed Systems", Nov. 1990, Computer Communications, vol. 13 No. 9, pp. 571-580.*

(Continued)

*Primary Examiner* — Brandon Hoffman
*Assistant Examiner* — Carlos Amorin

(57) ABSTRACT

An information processing system includes a first information processing device and a second information processing device. The first information processing device stores a first object group and an additional access control policies. The second information processing device stores access control policies applied to each of second objects. The additional access control policies indicate a changed object group for the each first object. The changed object group is a group of second objects whose access control policy is same as that of the first object. When the second information device obtains an operation request for the first object, the second information device accesses the additional access control policy and determines the changed object group. The second information system judges whether or not the operation request is feasible for the changed object group based on the access control policy, and determines whether or not the target first object is processed.

21 Claims, 17 Drawing Sheets

(56) References Cited

U.S. PATENT DOCUMENTS

| | | | |
|---|---|---|---|
| 7,779,265 B2 * | 8/2010 | Dubhashi et al. | 713/182 |
| 8,020,191 B2 * | 9/2011 | Bertino et al. | 726/1 |
| 8,353,005 B2 * | 1/2013 | Kabat et al. | 726/2 |
| 2008/0022370 A1 * | 1/2008 | Beedubail et al. | 726/4 |
| 2008/0320549 A1 * | 12/2008 | Bertino et al. | 726/1 |

FOREIGN PATENT DOCUMENTS

| | | |
|---|---|---|
| JP | 2005234864 A | 9/2005 |
| JP | 2007004610 A | 1/2007 |
| JP | 2007328400 A | 12/2007 |
| JP | 2008097214 A | 4/2008 |
| JP | 2008165300 A | 7/2008 |
| JP | 2008219419 A | 9/2008 |
| JP | 2008234263 A | 10/2008 |
| JP | 2009157750 A | 7/2009 |

OTHER PUBLICATIONS

International Search Report for PCT/JP2010/052033 mailed May 18, 2010.

A. Honda et al., "Policy addition mechanism of secure OS for embedded system", IPSJ SIG Technical Report, Mar. 6, 2008, pp. 109-114.

* cited by examiner

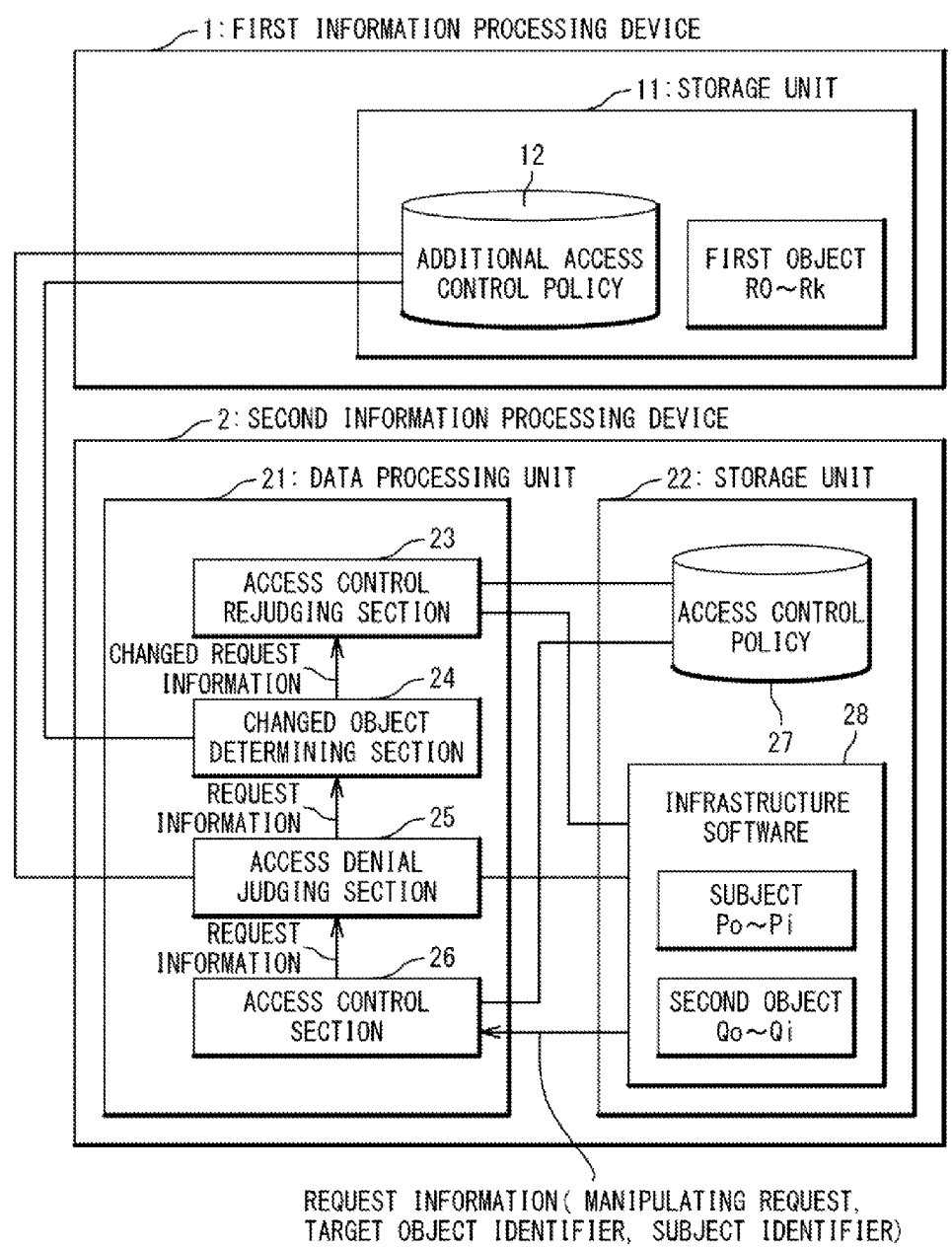

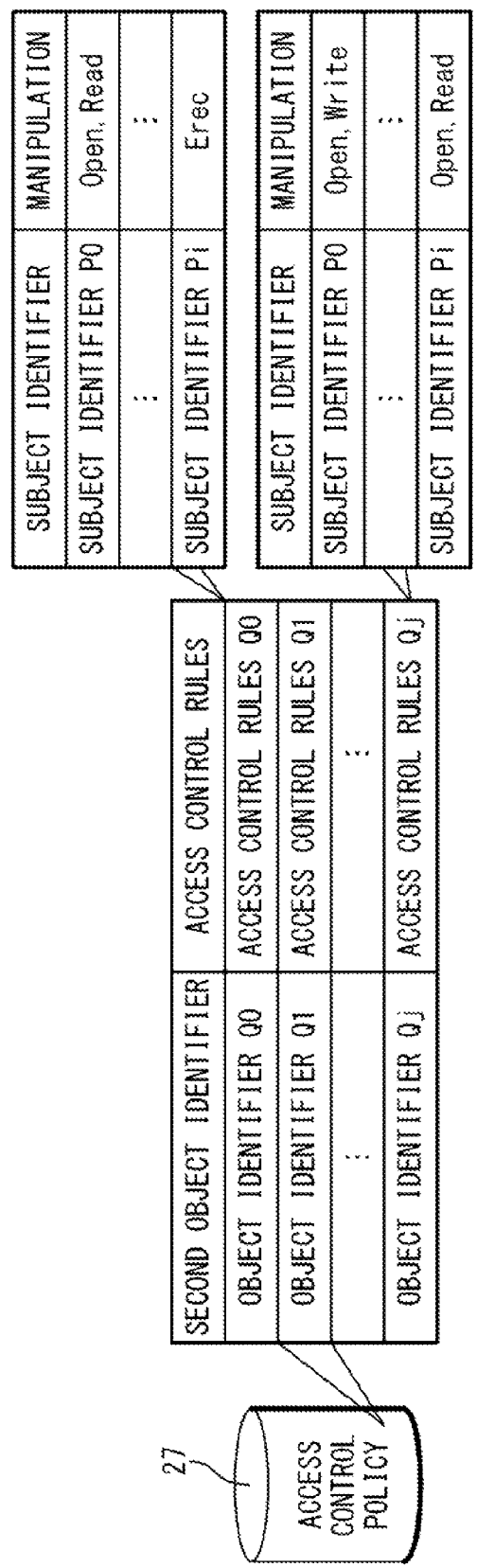

| SUBJECT IDENTIFIER | MANIPULATION |
|---|---|
| SUBJECT IDENTIFIER P10 | Open, Read, Write |

| SECOND OBJECT IDENTIFIER | ACCESS CONTROL RULE |
|---|---|
| OBJECT IDENTIFIER Q10 | ACCESS CONTROL RULE Q10 |

| OBJECT IDENTIFIER |
|---|
| OBJECT IDENTIFIER Q10 |

| FIRST OBJECT IDENTIFIER | CHANGED OBJECT IDENTIFIER GROUP |
|---|---|
| OBJECT IDENTIFIER R10 | CHANGED OBJECT IDENTIFIER GROUP R10 |

INFORMATION PROCESSING SYSTEM JUDGING WHETHER MANIPULATION IS POSSIBLE OR NOT BASED ON ACCESS CONTROL POLICY AND METHOD OF OPERATION THEREOF

TECHNICAL FIELD

The present invention relates to an information processing system and an operation method of the information processing system.

BACKGROUND ART

In recent years, systems and mobile devices having a function of distributed processing are increased. Following the increase, information processing systems have appeared in which data used in a device is saved in another device. Such information processing system has a device for saving data (hereinafter referred to as a data saving device) and a device for using data (hereinafter referred to as a data using device), and the data saving device and the data using device are connected through a network. Since the data is in the data saving device, a plurality of data using devices can be used. That is to say, a user can access the identical data by using different data using devices in accordance with time and places. Furthermore, a plurality of users can access the data in the data saving device by using different data using devices.

On the other hand, measures for preventing unauthorized manipulations are required for the information processing systems. For this reason, information processing devices are increased in which security is enhanced by installing an access control system such as a secure OS. In such information processing device, unauthorized manipulations (unauthorized deletion and rewrite) from a subject (e.g. a user, service, and a process) to an object (e.g. a file and a directory) are prevented by the access control system. More in detail, information is set as an access control policy, which indicates what manipulations (e.g. Read, Write, and Exec) by a certain subject are permitted or inhibited for which objects. Access feasibility for the object is judged in accordance with the access control policy. An example of such information processing system is disclosed in Japanese Patent Publication JP-P2002-91816A.

For the information processing system having the access control system, it is desired to easily set the access control policy. As techniques for easily setting the access control policy, Japanese Patent Publication JP-P2005-234864A and Japanese Patent Publication JP-P2008-219419A are exemplified.

As another related technique, an inventor is able to know the invention disclosed in Japanese Patent Publication JP-P2004-152295A.

CITATION LIST:

Patent Literatures

[Patent Literature 1]: Japanese Patent Publication JP-P2002-91816A
[Patent Literature 2]: Japanese Patent Publication JP-P2005-234864A
[Patent Literature 3]: Japanese Patent Publication JP-P2008-219419A
[Patent Literature 4]: Japanese Patent Publication JP-P2004-152295A

SUMMARY OF INVENTION

An information processing device having the access control system may be used as the data using device. In this case, it should be considered that a subject in the data using device may perform an unauthorized manipulation not only for data saved in the data using device but also for data saved in the data saving device. For this reason, it is considered that the access control policy is set even for the data of the data saving device, in the data using device.

The following approach can be considered in order to set the access control policy for the object of the data saving device, in the data using device. The access control policy is preliminarily set in the data saving device. When the data using device uses the data saving device, the access control policy stored in the data saving device is set in the data using device. Consequently, access to the data in the data saving device can be limited to access from a subject of a data using device that is permitted by the access control policy, and security can be enhanced.

However, the object saved in the data saving device may be changed dynamically. Additionally, the access control policy set in the data saving device is set by an administrator-of the data saving device or a subject which saved the data in the data saving device. Therefore, the access control policy stored in the data saving device may be changed dynamically. For this reason, a data using device needs to set the access control policy each time the data using device accesses to the data saving device.

In addition, the access control policy differs depending on a configuration of the information processing device. For this reason, when a file or an application is added to the data using device or a user is changed, the access control policy in the data using device needs to be reset.

The data using device performs processing by using the data stored in the data saving device. However, in the data saving device, many objects, such as data stored by other data using devices or directories generated by other users, are stored. The subject in the data using device may perform the unauthorized manipulation to such objects. Therefore, in the data using device, the access control policy needs to be set for every object stored in the data saving device. That is to say, in the data using device, it is necessary to set the access control policy for objects which are not used by the data using device.

That is to say, there is a problem that when the access control policy is set in the data using device, a load for setting is increased An information processing system according to the present invention includes: a first information processing device configured to save a first object group; and a second information processing device configured to acquire a manipulation request indicating a target object and manipulation content to perform processing for the target object based on the manipulation request. The second information processing device includes: an access control policy storing means for storing a correspondence relationship between each of second objects included in a second object group and a control rule indicating permitted manipulation content, as an access control policy; and a data processing means for judging whether or not the manipulation request can be processed. The first information processing device has an additional access control policy storing means which indicates, with respect to each of first objects included in the first object group, a group of the second objects of which manipulation feasibility is judged with a control rule same as the each first object, as a changed object group. The data processing means has: a changed object group determining means for referring to the additional access control policy when the target object is included in the first object group, and acquiring the changed object group which corresponds to the target object; and an access control rejudging means for judging whether or not the manipulation content indicated by the manipulation request can be processed for the changed object group by referring to the access control policy, and determining whether or not the manipulation request can be processed for the target object based on the judgment result.

An operation method of an information processing system according to the present invention is an operation method of an information processing system having a first information processing device for saving a first object group and a second information processing device for acquiring a manipulation request indicating a target object to be manipulated and manipulation content and performing processing for the target object based on the manipulation request. The operation method includes: a step of preliminarily storing a correspondence relationship between each second object included in a second object group, and a control rule indicating permitted manipulation content, in the second information processing device as an access control policy; a step of preliminarily storing, with respect to each of the first objects included in the first object group, information which indicates a group of the second objects of which manipulation feasibility is judged with the same control rule as the each first object, as a changed object group, in the first information processing device as an additional access control policy; and a step of judging whether or not the manipulation request can be processed. The step of judging includes: a step of acquiring the manipulation request by the second information processing device; a step of referring to the additional access control policy by the second information processing device when the target object is included in the first object group, and acquiring the changed object group which corresponds to the target object; and a step of judging whether or not the manipulation content included in the manipulation request can be processed for the changed object group by referring to the access control policy by the second information processing device, and determining whether or not the manipulation request can be processed for the target object based on the judgment result.

An operation program of the information processing system according to the present invention is a program for realizing the operation method of the information processing system by a computer.

According to the present invention, an information processing system, an operation method of the information processing system, and an operation program of the information processing system are provided, which can reduce a load for setting an access control policy in a data using device.

BRIEF DESCRIPTION OF THE DRAWINGS

FIG. 1 is a block diagram showing an information processing system according to the first embodiment;

FIG. 2A is a conceptual diagram showing an access control policy;

FIG. 12B is a conceptual diagram showing the content of an access control policy;

FIG. 12C is a conceptual diagram showing the content of an additional access control policy;

DESCRIPTION OF EMBODIMENTS (First Embodiment)

Figure 2B:
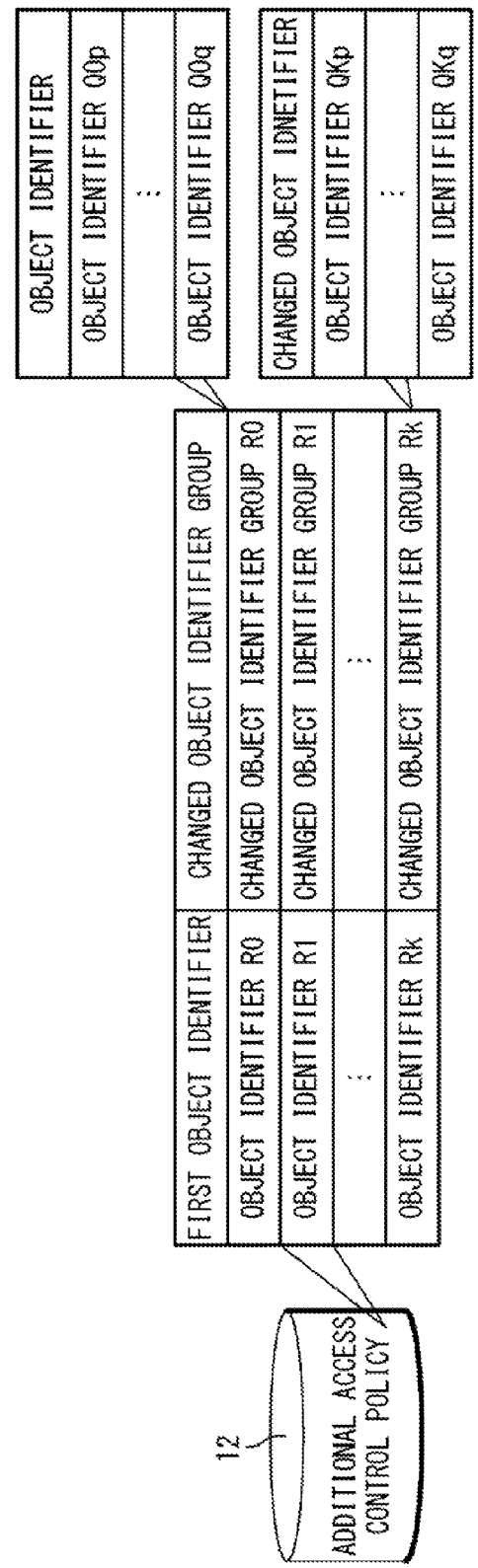
FIG. 2B is a conceptual diagram showing an additional access control policy.

The first embodiment of the present invention will be described below with reference to the drawings.

FIG. 1 is a block diagram showing an information processing system according to the present embodiment.

First, a schematic configuration of the information processing system will be described.

The information processing system includes a first information processing device 1 (data saving device) and a second information processing device 2 (data using device). The first information processing device 1 and the second information processing device 2 are connected through a network so as to access to each other. In the first information processing device 1, a first object group (R0 to Rk) is stored. In the second information processing device 2, a second object group (Q0 to Qi) is stored. In the second information processing device 2, a control rule applied to each second object included in the second object group is set as an access control policy 27. On the other hand, in the first information processing device 1, information is set as an additional access control policy 12 that indicates a group of second objects to which same control rule is applied, with respect to each of first objects included in the first object group.

Next, schematic operation of the information processing system will be described.

When the second information processing device 2 manipulates each first object of the first information processing device 1, the second information processing device 2 firstly refers to the access control policy 27. Here, it is assumed that a control rule applied to the first object that is a target object is not set in the access control policy 27. In this case, the second information processing device 2 accesses to the first information processing device 1 to refer to the additional access control policy 12. A group of second objects to which control rules same as the target first object is applied is identified as a changed object group. After that, the second information processing device 2 refers to the access control policy 27, and judges whether or not manipulation for each of the second objects included in the changed object group is possible. Consequently, it is substantially judged whether or not the manipulation for the target first object is possible.

According to the above configuration and operation, control rules for the first objects are not requested to be set as the access control policy 27 in the second information processing device 2. Therefore, it is possible to reduce loads for setting the access control policy 27.

Next, an information processing system according to the embodiment will be described in detail.

The first information processing device 1 functions as a data saving device for saving data. The first information processing device 1 has a storage unit 11. A hard disk is exemplified as the storage unit 11. In the storage unit 11, an additional access control policy 12 and the first object group are stored. Identifiers R0 to Rk (k is an integer larger than 0) are assigned to the first objects included in the first object group. Here, the object is a resource such as a file and a device, and can be a manipulation target. The additional access control policy 12 is information used for judging whether or not manipulation for the each first object is permitted. Details of the additional access control policy 12 will be explained later.

The second information processing device 2 processes a manipulation request from a subject to an object. The second information processing device 2 has a data processing unit 21 and a storage unit 22.

In the storage unit 22, an access control policy 27 and infrastructure software 28 are stored.

The infrastructure software 28 (infrastructure controller) has a second object group and a subject group. The infrastructure software 28 identifies each of the second objects included in the second object group by assigning object identifiers Q0 to Qj (j is an integer larger than 0). In the same way, the infrastructure software 28 identifies each of subjects included in the subject group by assigning subject identifiers P0 to Pi (i is an integer larger than 0).

The infrastructure software 28 has a function of acquiring a manipulation request for a target object from each subject and performing the acquired manipulation request. That is to say, the infrastructure software 28 obtains the manipulation request, identifies a subject which is an issuer of the manipulation request, and obtains the subject identifier P0 to Pi for identifying the issuer subject. Further, the infrastructure software 28 identifies the target object, and acquires the object identifier (Q0 to Qj, or R0 to Rk). The identifier of the issuer subject and the identifier of the target object are added to the manipulation request to be notified to the data processing unit 21, as request information.

For example, as the infrastructure software 28, an OS is used. However, the OS is nothing but one example, and other software having the same function may also be used.

For example, each subject is a process or a user. In FIG. 1, the each subject is provided in the infrastructure software 28. However, there is also a case where another configuration different from the infrastructure software 28 is the subject.

Additionally, in FIG. 1, the second object group is provided in the infrastructure software 28. 1. However, there is also a case where the second object group is provided separately from the infrastructure software 28 in the storage unit 22.

The access control policy 27 is information used for judging whether or not the manipulation request is feasible.

FIG. 2A is a conceptual diagram showing the access control policy 27. As shown in FIG. 2A, the access control policy 27 indicates access control rules Q0 to Qj with respect to the second object identifiers Q0 to Qj. Further, in the each of the access control rules Q0 to Qj, with respect to the each of the subject identifiers P0 to Pi, permitted manipulations are indicated. For example, as shown in FIG. 2A, in the access control policy 27, an access control rule Q0 is assigned to the second object identifier Q0. In the access control rule Q0, the manipulation contents of "Open" and "Read" are assigned to the subject identifier P0. That is to say, when the subject P0 manipulates the object Q0, the manipulations of "Open" and "Read" are permitted.

Here, in the present embodiment, it is not necessary to set control rules for the first object group R0 to Rk as the access control policy 27.

Next, the data processing unit 21 will be described. The data processing unit 21 judges whether or not the manipulation request is feasible. The data processing unit 21 has an access control section 26, an access denial judging section 25, a changed object determining section 24, and an access control rejudging section 23. These sections are realized by a CPU executing an operation program of an information processing system stored in a recording medium such as a ROM (Read Only Memory).

The access control section 26 acquires the request information from the infrastructure software, refers to the access control policy 27, and judges whether or not the manipulation request acquired by the infrastructure software 28 is permitted. More in detail, the access control section 26 judges whether or not the identifier of the target object is included in the access control policy 27. When included, the access control rule corresponding to the identifier of the target object is referenced. It is then judged whether or not the manipulation content indicated by the manipulation request is assigned to the identifier of the issuer subject. When the manipulation content is assigned to the identifier of the issuer subject, the infrastructure software 28 is notified that the manipulation request is permitted. On the other hand, when the manipulation content does not assigned to the identifier of the issuer subject, the infrastructure software 28 is notified that the manipulation request is not permitted. If the identifier of the target object is not included in the access control policy 27, the fact is notified to the access denial judging section 25, together with the request information.

As the access control section 26 mentioned above, for example, an access control mechanism such as SELinux using LSM (Linux Security Module) of Linux and SMACK or the like are exemplified. However, another access control mechanism having the same function as the aforementioned mechanisms may be used.

The access denial judging section 25 judges whether or not the target object is included in the first object group RO to Rk, based on the request information. That is to say, when the request information is obtained from the access control section 26, the access denial judging section 25 refers to the storage unit 11 of the first information processing device 1. Then, it is judged whether or not the target object is included in the first object group R0 to Rk. If included, the access denial judging section 25 notifies the changed object determining section 24 of that fact, together with the request information. If not included, the fact is notified to the infrastructure software 28.

When receiving the request information from the access denial judging section 25, the changed object determining section 24 refers to the additional access control policy 12 of the first information processing device 1.

Here, the additional access control policy 12 will be explained. FIG. 2B is a conceptual diagram showing the additional access control policy 12. As shown in FIG. 2B, the additional access control policy indicates changed object identifier group (R0 to Rk) with respect to each of the first object identifiers (R0 to Rk). The changed object identifier group (R0 to Rk) indicates a group of second objects of which feasibility is judged with a control rule same as that of the corresponding first object. The each changed object identifier group (R0 to Rk) is represented by a group of the second object identifiers (Q0 to Qj). That is to say, in the example shown in FIG. 2B, with respect to the first object R0, the second object identifiers Q0p to Q0q are assigned as the changed object identifier group R0. This means that a control rule for the first object R0 is same as those for the second objects Q0p to Q0q.

After referring to the additional access control policy 12, the changed object determining section 24 acquires a changed object identifier group which is assigned to the identifier of the target object. Then the changed object group is added to the request information to generate changed request information. The changed request information is notified to the access control rejudging section 23.

After acquiring the changed request information, the access control rejudging section 23 refers to the access control policy 27. It is then judged whether or not the manipulation content (manipulation request) from the issuer subject to the objects indicated by the changed object identifier group is permitted. When the manipulation content is judged to be permitted, it is judged that the manipulation for the target object is also permitted. The access control rejudging section 23 informs the infrastructure software 28 of the judgment result. The infrastructure software 28 decides whether or not the manipulation request is performed, in accordance with the judgment result acquired from the access control rejudging section 23.

Note that the changed object identifier group may include a plurality of second object identifiers. In such a case, the access control rejudging section 23 can judge that the manipulation is permitted for the target object when the manipulation is permitted for at least one second object of the changed object identifiers group. That is to say, it is possible to judge feasibility of manipulation for the target object, by calculating a logical sum of manipulation contents which are assigned to the second object identifiers.

Alternatively, it is also possible to calculate a logical product to judge that the manipulation is permitted for the target object only when the manipulation is permitted for all of the second objects included in the changed object identifier group.

For example, it is assumed that manipulations of "open, read" are assigned to one second object identifier included in the changed object identifier group. Additionally, it is assumed that manipulations of "read, exec" are assigned to another second object identifier included in the changed object identifier group. In this case, if the logical sum is used, the access control rejudging section 23 judges that the manipulation contents of "open, read, exec" are permitted for the target object. On the other hand, if the logical product is used, a manipulation content of "read" is judged as manipulation content permitted for the target object.

As mentioned above, in the information processing system according to the present embodiment, in the additional access control policy 12, a group of second objects of which manipulation feasibility is judged with the same control rule as the each first object is set as the changed object group. Even when the target object is stored in the first information processing device 1, the second information processing device 2 can identify a second object group of which manipulation feasibility is judged with the same control rule as the target object, by referring to the additional access control policy 12. Therefore, only control rules for the second object group have to be set in the access control policy 27 of the second information processing device 2, and setting of the control rules for the first object group is not necessary. For this reason, a load at the time of setting the access control policy 27 is reduced.

Additionally, the second information processing device 2 does not need to set the access control policy 27 each time the second information processing device 2 accesses to the first information processing device 1. For this reason, a load for setting the access control policy 27 is reduced.

Next, an operation method of the information processing system according to the present embodiment will be described in detail. Here, operation in a case will be described Where a subject Px manipulates a first object Z in the first information processing device 1 through the second information processing device 2.

Figure 3:
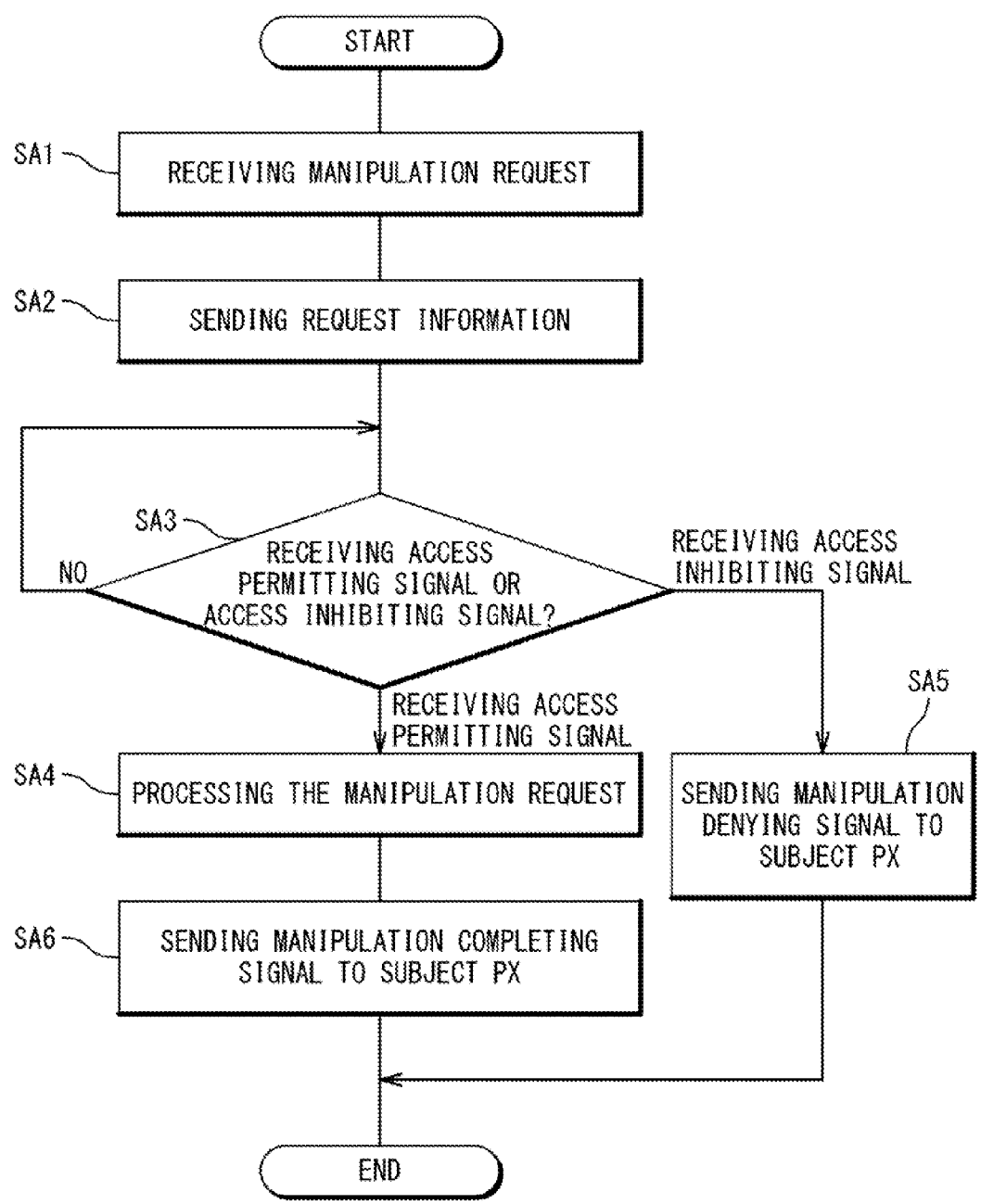
FIG. 3 is a flow chart showing an operation method of infrastructure software.

First, operation of the infrastructure software 28 will be described. FIG. 3 is a flow chart showing an operation method of the infrastructure software 28.

It is assumed that the subject Px has issued a manipulation request for manipulating the object Z, to the infrastructure software 28. The infrastructure software 28 receives the manipulation request for the object Z from the subject Px (step A1).

The infrastructure software 28 identifies the subject Px, which is an issuer of the manipulation request, and acquires a subject identifier Px. The infrastructure software 28 also identifies a target object Z of the manipulation request and acquires an object identifier Z. The infrastructure software 28 then adds the subject identifier Px and the object identifier Z to the manipulation request to send to the access control section 26 of the data processing unit 21, as request information (step A2).

After sending the request information, the infrastructure software 28 waits for a signal (an access permitting signal or an access inhibiting signal) indicating a judgment result of the data processing unit 21 (step A3). When receiving the access permitting signal, the manipulation request from the subject Px to the object Z is processed (step A4). A manipulation completing signal is sent to the subject Px thereafter (step A6). On the other hand, when receiving the access inhibiting signal, a manipulation denying signal is sent to the subject Px (step A5).

Figure 4:
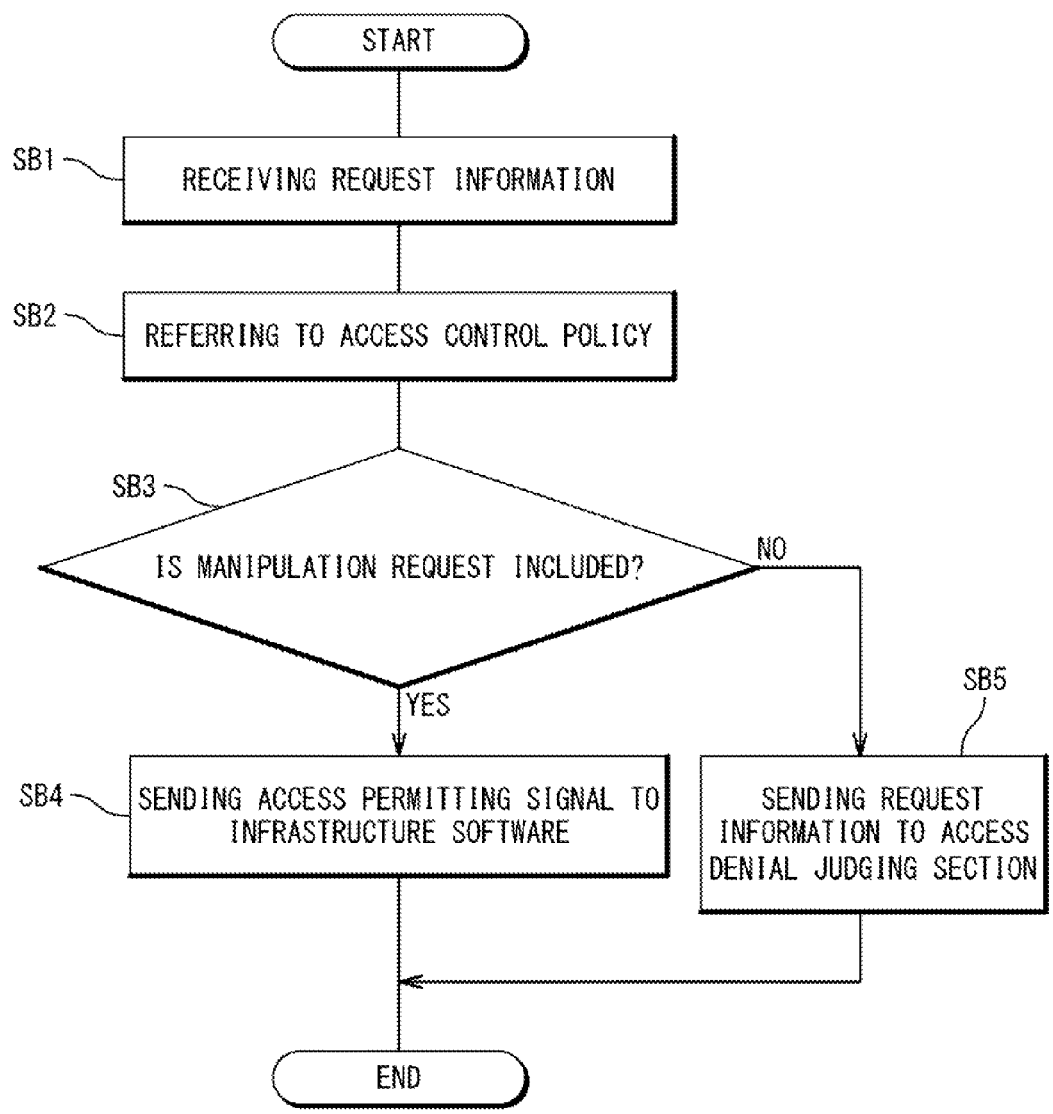
FIG. 4 is a flow chart showing operation of an access control section.

Next, operation of the access control section 26 will be described in detail. FIG. 4 is a flow chart showing the operation of the access control section 26.

The access control section 26 receives request information from the infrastructure software 28 (step B1). The access control section 26 refers to the access control policy 27 (step B2). It is then judged whether or not the target object Z is included in the access control policy 27. When the target object Z is included in the access control policy 27, an access control rule Z which corresponds to the target object is referred. It is judged whether or not the manipulation content (manipulation request) is assigned to the subject identifier Px in the access control rule Z (step B3). If the manipulation content is assigned, the manipulation request is judged to he permitted, and the access permitting signal is sent to the infrastructure software 28 (step B4). On the. other hand, if the target object Z is not included, the request information is sent to the access denial judging section 25 (step B5).

Figure 5:
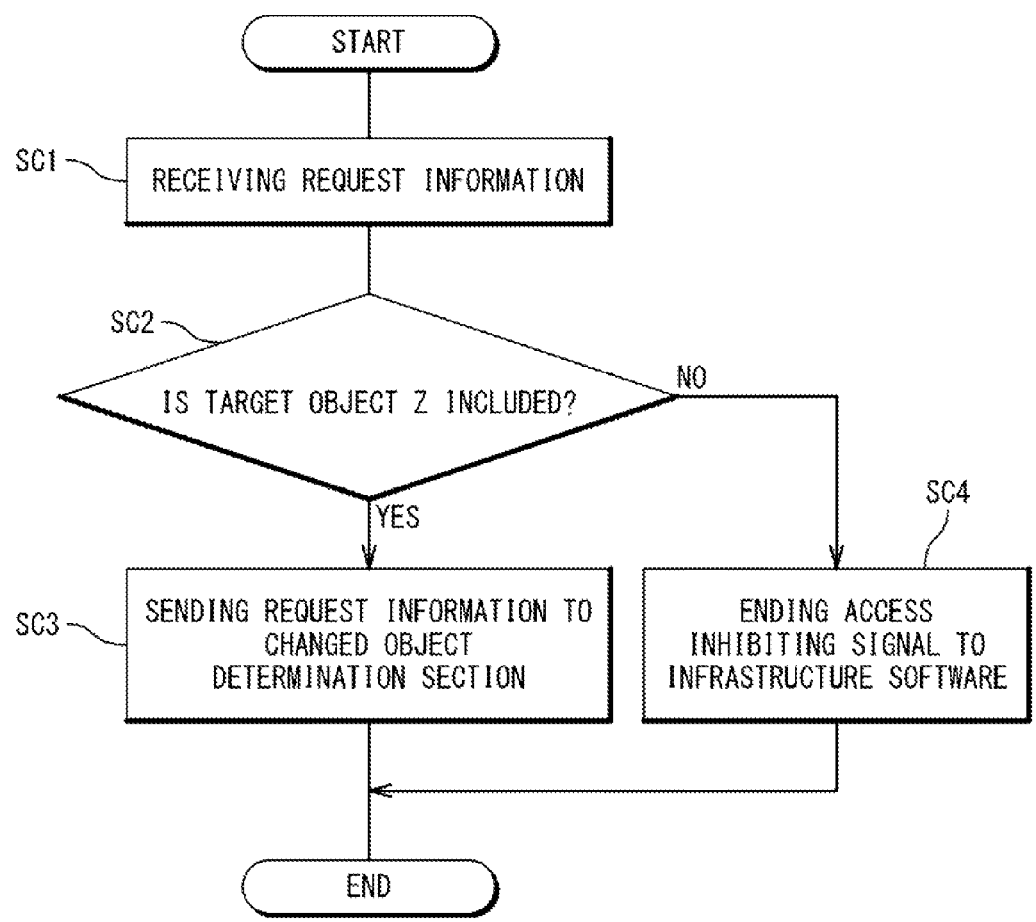
FIG. 5 is a flow chart showing operation of an access denial judging section.

Next, operation of the access denial judging section 25 will be described in detail. FIG. 5 is a flow chart showing the operation of the access denial judging section 25.

The access denial judging section 25 acquires request information from the access control section 26 (step C1). The access denial judging section 25 accesses the first information processing device 1 to judge whether or not the target object Z is included in the first object group (step C2). When the target object Z is included in the first object group, the changed object determining section 24 is notified of the request information (step C3). On the other hand, when the target object Z is not included in the first object group, an access inhibiting signal is sent to the infrastructure software 28 (step C4).

Figure 6:
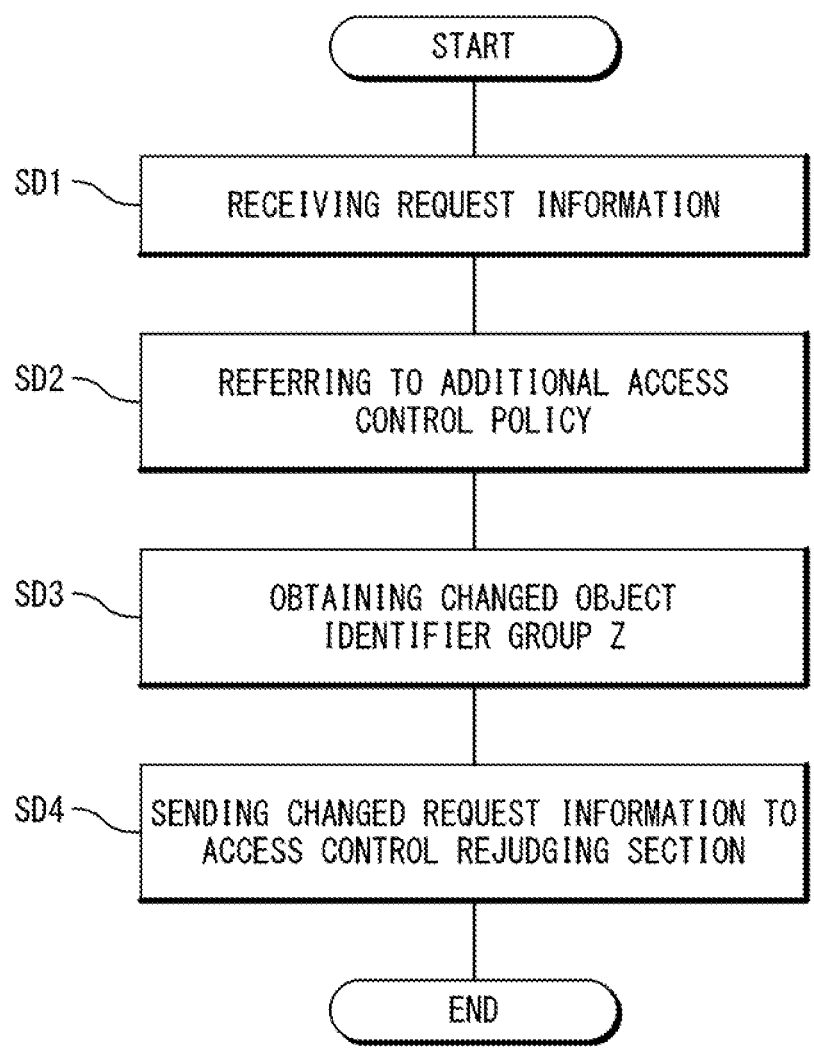
FIG. 6 is a flow chart showing operation of a changed object determining section.

Next, operation of the changed object group determining section 24 will be described in detail. FIG. 6 is a flow chart showing the operation of the changed object group determining section 24.

The changed object group determining section 24 acquires the request information from the access denial judging section 25 (step D1). The changed object determining section 24 refers to the additional access control policy 12 (step D2). The changed object identifier group Z is acquired, which corresponds to the object identifier Z (step D3). The changed object group determining section 24 adds the changed object group to the request information to generate changed request information. The changed request information is sent to the access control rejudging section 23 (step D4).

Figure 7:
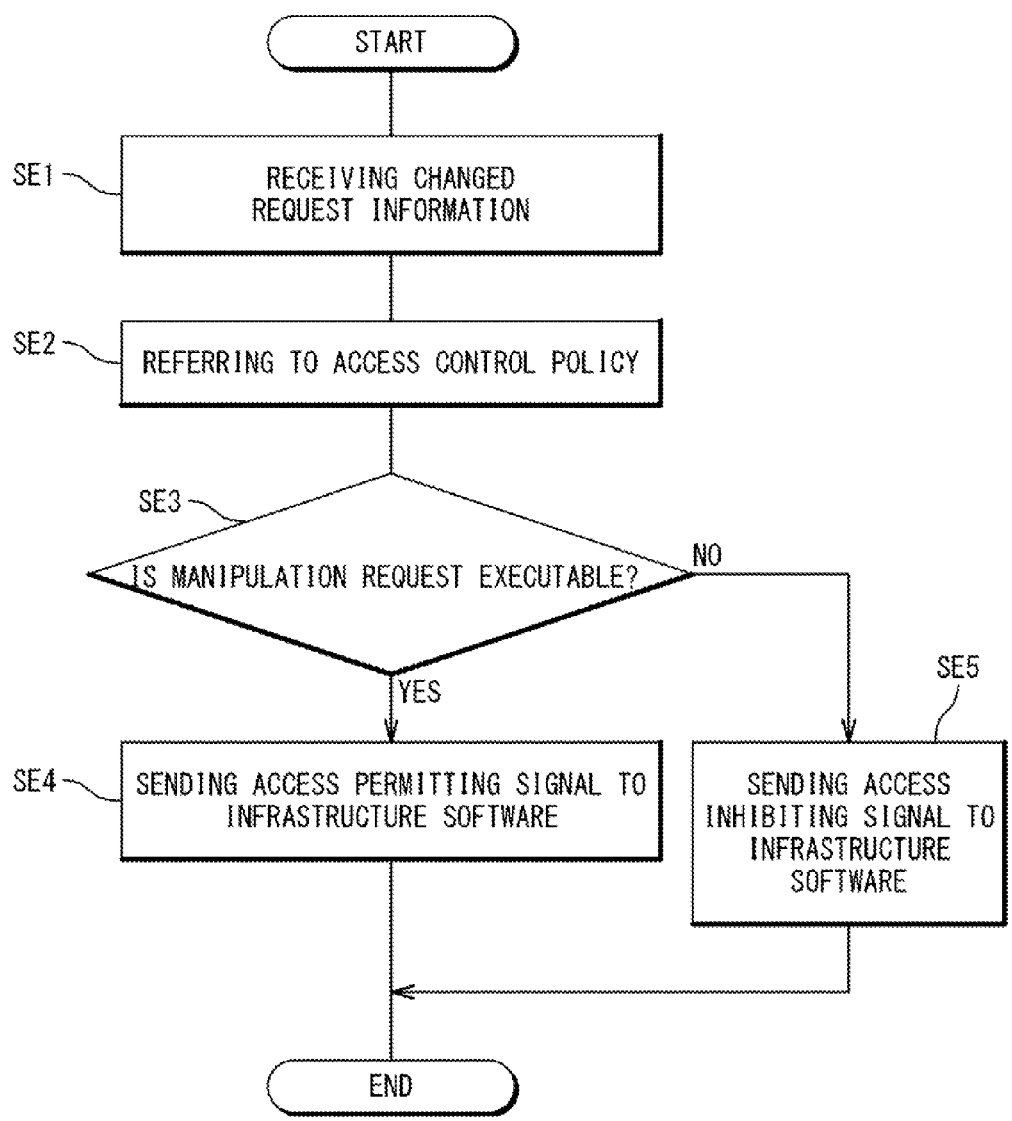
FIG. 7 is a flow chart showing operation of an access control rejudging section.

Next, operation of the access control rejudging section 23 will be described in detail. FIG. 7 is a flow chart showing the operation of the access control rejudging section 23.

The access control rejudging section 23 receives the changed request information from the changed object group determining section 24 (step E1). The access control rejudging section 23 refers to the access control policy 27 (step E2). It is then judged whether or not the subject identifier Px can perform the manipulation request for the second objects group indicated by the changed object identifier group Z (step E3). When the manipulation request is judged to be feasible for the changed object group Z, the manipulation request is judged to be feasible for the target object to as well, and an access permitting signal is sent to the infrastructure software 28 (step E4). When the manipulation request is judged not to be feasible for the changed object group Z, the manipulation request is judged not to be feasible for the target object Z and an access inhibiting signal is sent to the infrastructure software 28 (step E5).

As mentioned above, according to the present embodiment, since the additional access control policy 12 is stored in the first information processing device 1, it can be judged whether the manipulation request for the first object group is feasible or not, based on control rules for the second object group. For this reason, only the control rules for the second object group need to be set as the access control policy 27 of the second information processing device 2. Since control rules for the first object group do not need to be set as the access control policy 27, a load for setting the access control policy 27 can be reduced.

Since control rules for the first object group do not need to be set as the access control policy 27, the access control policy 27 does not need to be set each time the second information processing device 2 accesses the first information processing device 1. From this viewpoint, a load for setting the access control policy 27 is reduced.

Further, even when an object used by a data using device different from the second information processing device 2 is included in the first object group of the first information processing device 1, a control rule for the object does not need to be set as the access control policy 27. From this viewpoint, a load for setting the access control policy 27 is reduced.

In the present embodiment, as the manipulation content, "read" and "open" are exemplified. However, as the manipulation content, an amount of resource used at manipulating the object may be used. Additionally, as the manipulation content, access feasibility may be used.

(Second Embodiment)

Figure 8:
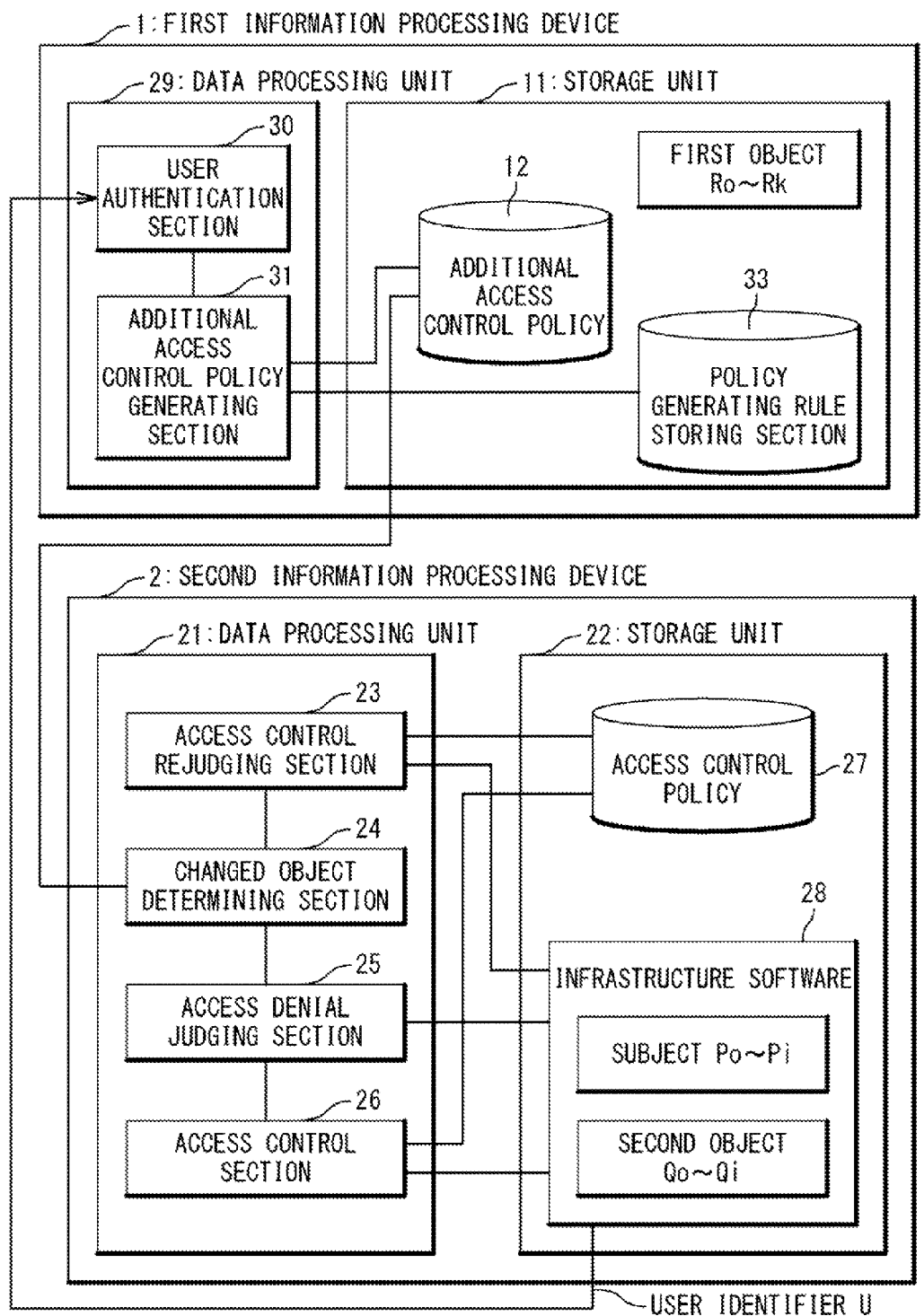
FIG. 8 is a schematic diagram showing an information processing system according to the second embodiment.

Next, the second embodiment of the present invention will be described. FIG. 8 is a conceptual diagram showing an information processing system according to the present embodiment.

As shown in FIG. 8, in the information processing system according to the present embodiment, a configuration of a first information processing device 1 is changed from the first embodiment. That is to say, a data storage unit 29 is added to the first information processing device 1. Additionally, a policy generating rule storing section 33 is added to the storage unit 11. Additionally, a function of infrastructure software 28 is changed from the first embodiment. The others are the same as the first embodiment, and detailed explanation is omitted.

The infrastructure software 28 has a function of storing user identifiers U0 to Us of users U0 to Us (s is an integer larger than 0) who use a second information processing device 2. The infrastructure software 28 has a function of identifying a user who uses the second information processing device 2, and informs the data processing unit 29 of the identifier U0 to Us of the identified user. As an example of a means for identifying the user using the second information processing device 2, fingerprint authentication and facial recognition or the like are considerable, however, other method may be also used. In other respects, the infrastructure software 28 has the same functions as the infrastructure software 28 of the first embodiment.

Figure 9:
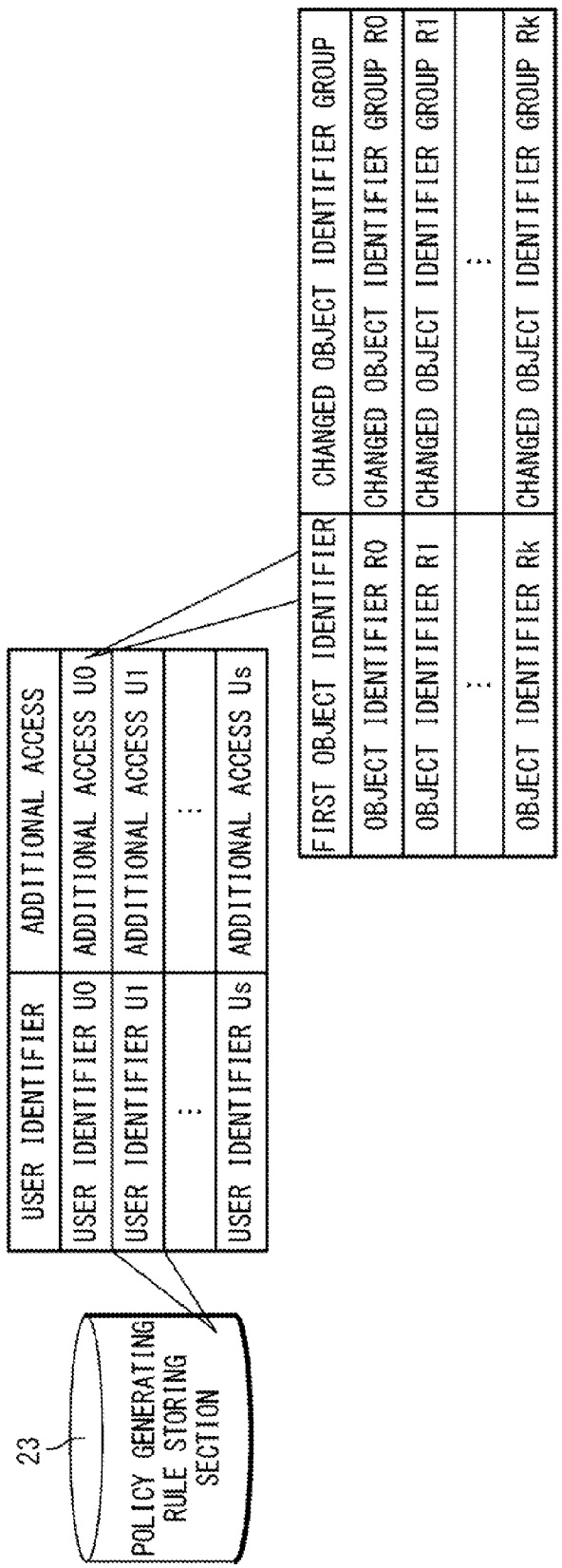
FIG. 9 is a conceptual diagram showing information stored in a policy generating rule storing section.

Next, the policy generating rule storing section 33 will be described. FIG. 9 is a conceptual diagram showing information stored in the policy generating rule storing section 33. As shown in FIG. 9, the policy generating rule storing section 33 stores correspondence relationships between the user identifiers U0 to Us and additional access control rules U0 to Us. The additional access control rule Uy (y is an integer larger than 0) indicates correspondence relationships between first object identifiers R0 to Rk and changed object identifier groups R0 to Rk.

Next, the data processing unit 29 will be described. The data processing unit 29 has a user authentication section 30 for performing user authentication, and an additional access control policy generating section 31 for changing an additional access control policy in accordance with users.

Figure 10:
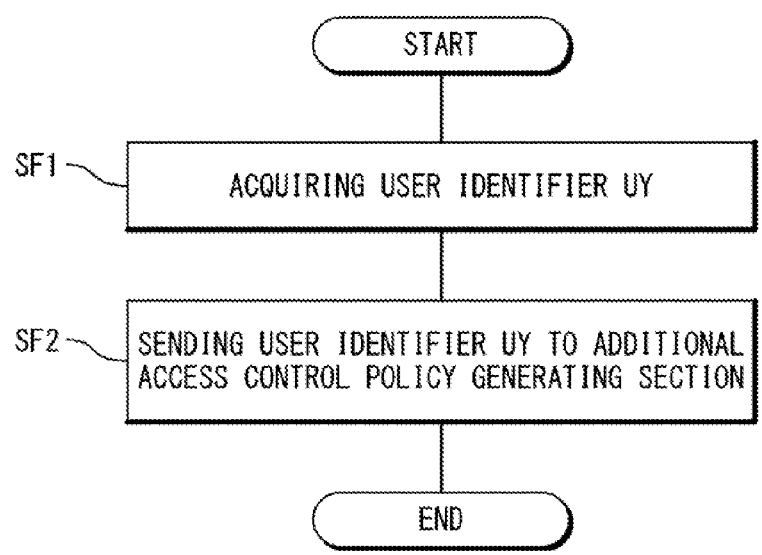
FIG. 10 is a flow chart showing operation of a user authentication section.

Operation of the user authentication section 30 will be described. FIG. 10 is a flow chart showing the operation of the user authentication section 30. The user authentication section 30 acquires the user identifier Uy of the user who uses the second information processing device 2, from the infrastructure software 28 (step F1). The additional access control policy generating section 31 is notified of the acquired user identifier Uy (step F2).

Figure 11:
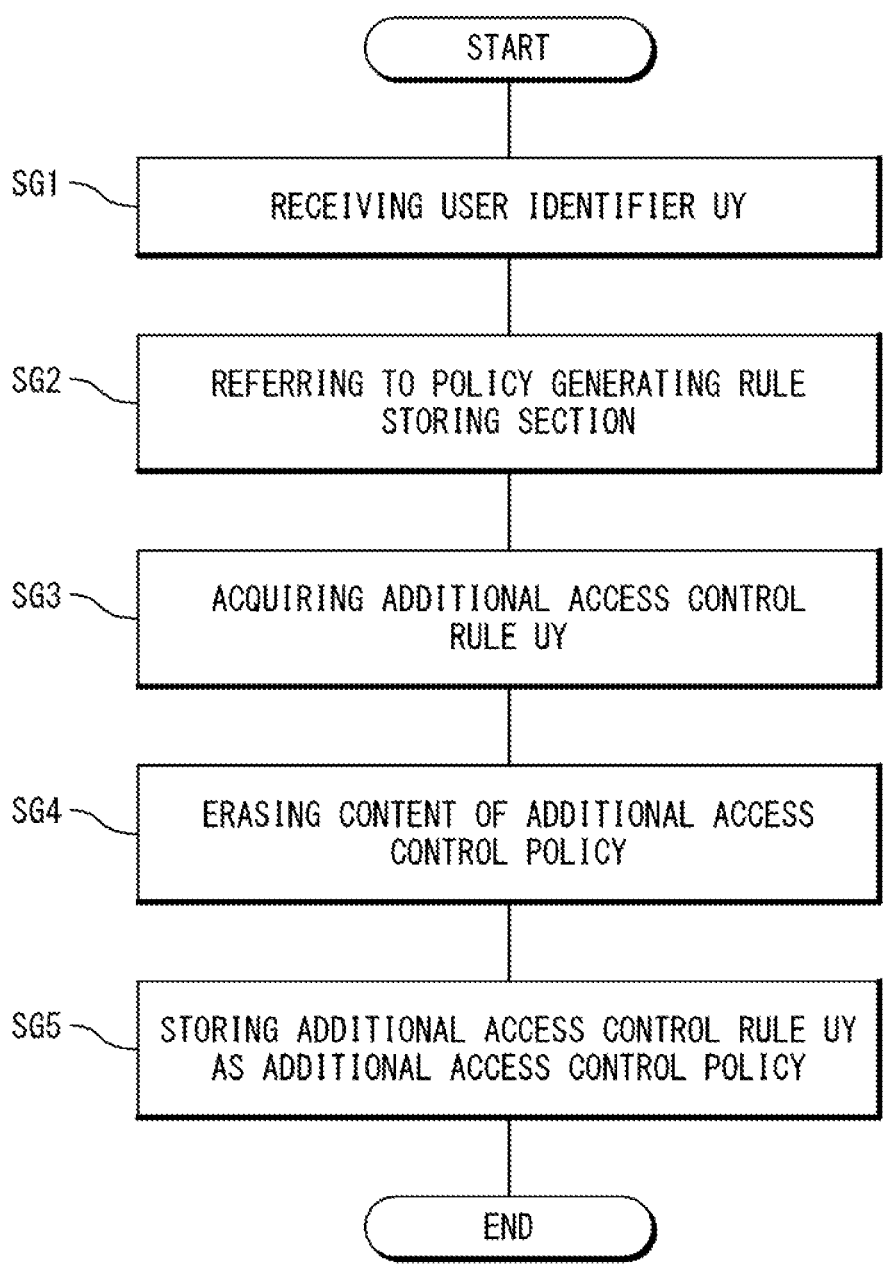
FIG. 11 is a flow chart showing operation of an additional access control policy generating section.

Operation of the additional access control policy generating section 31 will be described. FIG. 11 is a flow chart showing the operation of the additional access control policy generating section 31. The additional access control policy generating section 31 receives the user identifier Uy (step G1), and refers to the policy generating rule storing section 33 (step G2). Then, an additional access control rule Uy, which corresponds to the user identifier Uy, is acquired (step G3). The additional access control policy generating section 31 accesses the additional access control policy 12 and erases the content of the additional access control policy 12 (step G4). After that, the additional access control rule Uy is stored as the additional access control policy 12 (step G5).

According to the present embodiment, an effect same as the first embodiment can be obtained. In addition, it is possible to change a control rule applied to a first object of the first information processing device 1 in accordance with users using the second information processing device 2.

Examples will be described below in order to describe the present invention more in detail.

EXAMPLE 1

First, an example 1 will be described. The example 1 corresponds to the first embodiment.

Figure 12A:
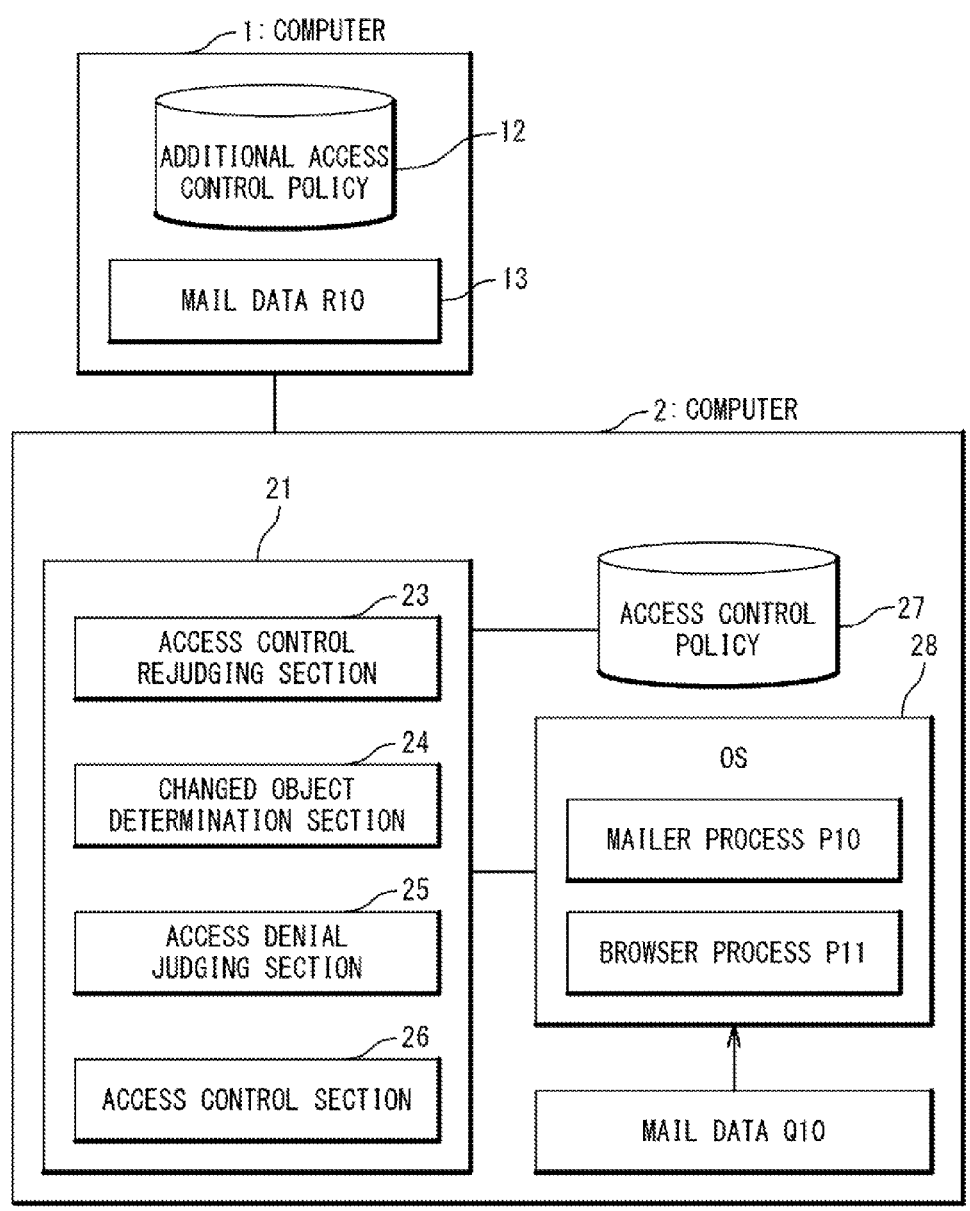
FIG. 12A is a schematic diagram showing an information processing system according to an example 1.

FIG. 12A is a schematic diagram showing an information processing system according to the example 1.

The information processing system according to the present example includes a computer 1 (first information processing device) and a computer 2 (second information processing device), which are operated by a program. Each of the computers has a memory area (not shown). The computer 1 and the computer 2 are connected so that access is possible through a network.

In the memory area of the computer 2, an OS 28 as infrastructure software 28, and an access control policy 27 are stored.

The OS 28 has a mailer process P10 and a browser process P11. A subject identifier P10 is assigned to the mailer process P10 and a subject identifier P11 is assigned to the browser process P11. The OS 28 manages mail data Q10. A second object identifier Q10 is assigned to the mail data Q10.

FIG. 12B is a conceptual diagram showing the content of the access control policy 27. In the access control policy 27, an access control rule Q10 is assigned to an object identifier Q10. In the access control rule Q10, the manipulation contents of "Open", "Read", and "Write" are assigned to the subject identifier P10. According to the access control policy 27, as permitted manipulations for the mail data Q10 that is the object Q10, the manipulations of "Open", "Read", and "Write" by the subject P10 (mailer process P10) are indicated.

The computer 2 has an access control section 26, an access denial judging section 25, a changed object determining section 24, and an access control rejudging section 23, in addition to the OS 28.

On the other hand, in the memory area of the computer 1, an additional access control policy 12 and mail data R10 are stored. A first object identifier R10 is assigned to the mail data R10.

FIG. 12C is a conceptual diagram showing the additional access control policy 12. As shown in FIG. 12C, in the additional access control policy 12, a changed object identifier group R10 is assigned to the first object identifier R10. The changed object identifier group R10 includes a second object identifier Q10.

Next, an operation method of the information processing system according to the present example will be described.

It is assumed that the mailer process P10 managed by the OS 28 attempts "Open" for the mail data R10 of the computer 1. The mailer process P10 sends an Open system call as a manipulation request to the OS 28 in order to open the mail data R10. The OS 28 receives the manipulation request from the mailer process P10. Then the subject identifier P10 of the mail process P10 and the first object identifier R10 indicating the mail data R10 are acquired. The subject identifier P10 and the first object identifier R10 are added to the manipulation request, and the manipulation request is sent to the access control section 26 as request information. The OS 28 then waits for an access permitting signal or an access inhibiting signal.

When receiving the request information, the access control section 26 refers to the access control policy 27. It is then judged whether or not the access control rule R10 corresponding to the object identifier R10 is stored in the access control policy 27. Here, the access control rule R10 is not stored in the access control policy 27. Therefore, the access control section 26 notifies the access denial judging section 25 of that fact, together with the request information.

When receiving the request information, the access denial judging section 25 judges whether or not an object corresponding to the object identifier R10 is stored in the computer 1. Now the mail data R10 of the object identifier R10 is stored in the computer 1. Therefore, the access denial judging section 25 notifies the changed object determining section 24 of a judgment result, together with the request information.

When receiving the request information, the changed object determining section 24 refers to the additional access control policy 12. Then the object identifier group R10 which corresponds to the object identifier R10, is acquired as a changed object identifier group R10. The changed object identifier group R10 is added to the request information to be notified to the access control rejudging section 23, as changed request information.

After receiving the changed request information, the access control rejudging section 23 refers to the access control policy 27. Here, the changed Object identifier group R10 indicates the object identifier Q10. The access control rejudging section 23 refers to the access control policy 27 and refers to the access control rule Q10 that corresponds to the object identifier Q10. It is then judged whether or not the manipulation content (Open) of the manipulation request is assigned to the subject identifier P10 in the access control rule Q10. Now in the access control policy 27, "Open" which is the content of the manipulation request is assigned to the subject identifier P10. Therefore, the access control rejudging section 23 judges that the manipulation request should be permitted and sends an access . permitting signal to the OS 28.

After receiving the access permitting signal, the OS 28 performs processing of an Open system call for the mail data R10, and sends a manipulation completing signal to the mailer process P10.

Next, operation in a case where the browser process P11 of the OS 28 attempts "Open" for the mail data R10 of the computer 1, will be described. The browser process P11 generates an Open system call as a manipulation request and sends the Open system call to the OS 28 in order to open the mail data R10. The OS 28, after receiving the manipulation request, acquires the subject identifier P11 of the browser process P11 and the object identifier R10 of the mail data R10 that is a target object. Then the subject identifier P11 and the object identifier R10 are added to the manipulation request to be notified to the access control section. 26, as request information. The OS 28 waits for an access permitting signal or an access inhibiting signal.

The access control section 26, after receiving the request information, refers to the access control policy 27. It is then judged whether or not the access control rule R10 corresponding to the object identifier R10 is stored in the access control policy 27. Now in the access control policy 27, the access control rule R10 is not stored. Therefore, the access control section 26 sends that fact to the access denial judging section 25, together with the request information.

The access denial judging section 25, after receiving the request information, judges whether or not an object corresponding to the object identifier R10 is stored in the computer 1. Now in the computer 1, the mail data R10 to which the object identifier R10 is assigned, is stored. Therefore, the access denial judging section 25 notifies the changed object determining section 24 of that fact and the request information.

The changed object determining section 24, after acquiring the request information, refers to the additional access control policy 12. Then the changed object identifier group R10 which corresponds to the object identifier R10 is acquired. Then the changed object identifier group R10 is added to the request information to be notified to the access control rejudging section 23, as changed request information.

The access control rejudging section 23, after acquiring the changed request information, refers to the access control policy 27. The changed object identifier group R10 includes the object identifier Q10. Therefore, the access control rejudging section 23 refers to the access control rule Q10 which corresponds to the object identifier Q10. It is then judged whether or not the content (Open) of the manipulation request is assigned to the subject identifier P11. Now the correspondence relationship between the subject identifier P11 and the manipulation request (Open) is not stored in the access control policy 27. For this reason, the access control rejudging section 23 judges that the manipulation request should be inhibited and sends an access inhibiting signal to the OS 28. The OS 28, after receiving the access inhibiting signal, sends a manipulation denying signal to the browser process P11.

EXAMPLE 2

Next, an example 2 will be described. The present example corresponds to the second embodiment.

Figure 13:
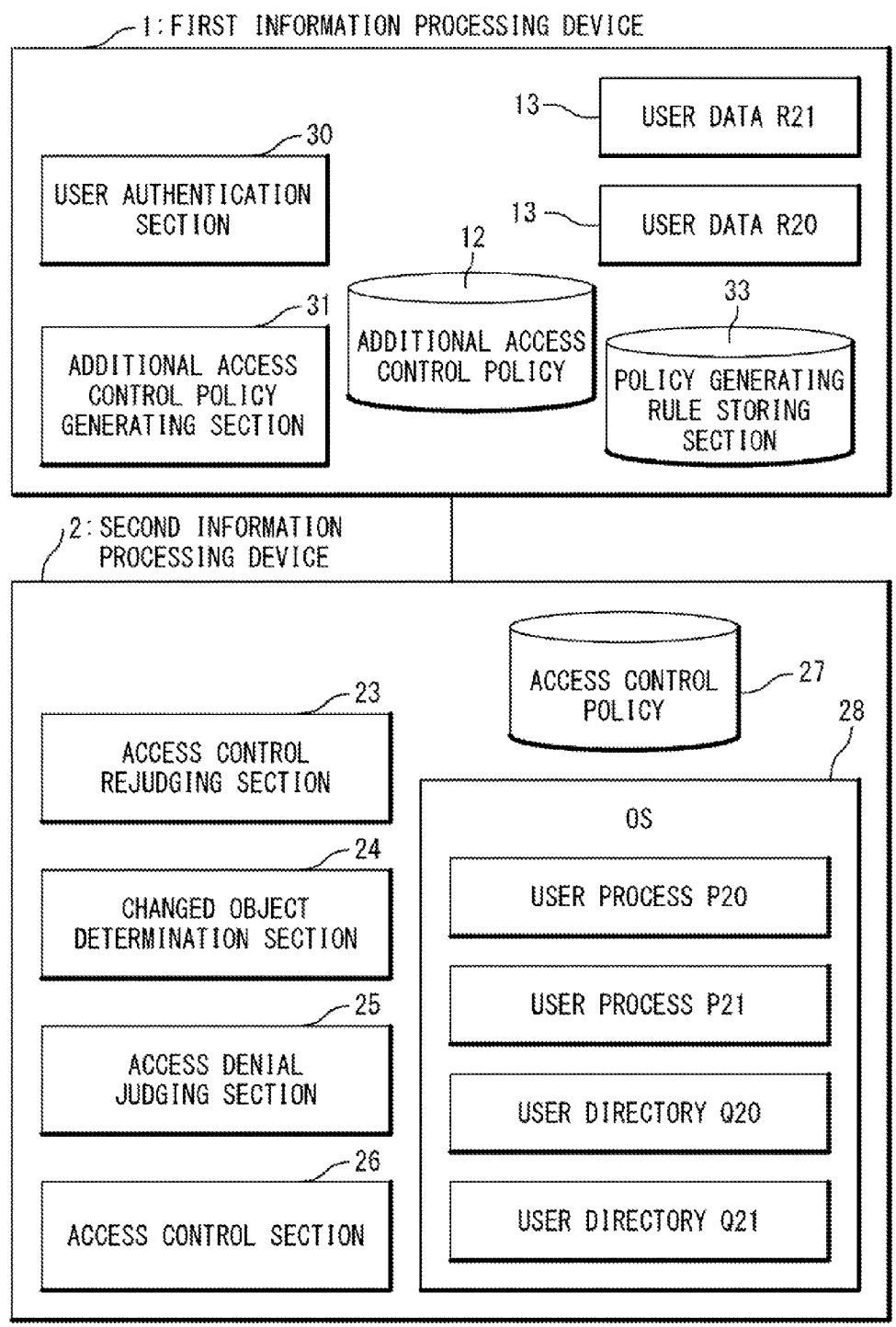
FIG. 13 is a schematic diagram showing an information processing system according to an example 2.

FIG. 13 is a schematic diagram showing an information processing system according to the present example. The information processing system has a computer 1 (first information processing device) and a computer 2 (second information processing device). Each of the computer 1 and the computer 2 has a memory area (not shown). The computer 1 and the computer 2 are connected so that access is possible through a network.

In the memory area (not shown) of the computer 2, an OS 28 as infrastructure software 28, and an access control policy 27 are stored.

The OS 28 has a user process P20 to which a subject identifier P20 is assigned, and a user process P21 to which a subject identifier P21 are assigned. The OS 28 manages a user directory Q20 to which an object identifier Q20 is assigned, and a user directory Q21 to which an object identifier Q21 is assigned.

Figure 14A:
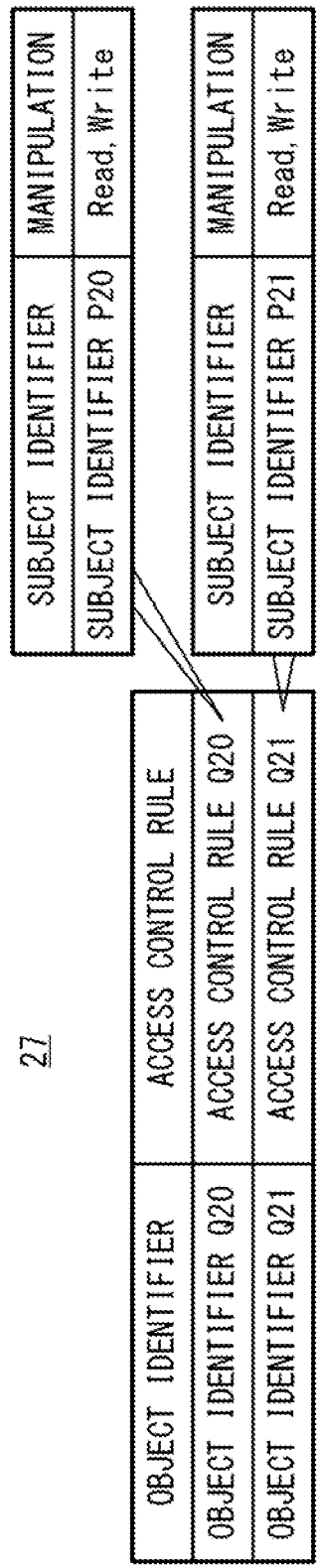
FIG. 14A is a conceptual diagram showing the content of an access control policy.

FIG. 14A is a conceptual diagram showing the content of the access control policy 27. In the access control policy 27, an access control rule Q20 which corresponds to the object identifier Q20 and an access control rule Q21 which corresponds to the object identifier Q21, are preliminarily stored. More in detail, the manipulations of "Read" and "Write" are permitted for the user process P20 (subject identifier P20) with respect to the user directory Q20 (object identifier Q20). Additionally, the manipulations of "Read" and "Write" are permitted for the user process P21 (subject identifier P21) with respect to the user directory Q21 (object identifier Q21).

Additionally, the OS 28 has a function of identifying the users (U20 and U21) who use the computer 2, by assigning the user identifiers (U20 and U21) to the users (U20 and U21).

The computer 2 has an access control section 26, an access denial judging section 25, a changed object determining section 24, and an access control rejudging section 23. These sections are realized by OS28 executing an operation program of the information processing system.

In the memory area of the computer 1, on the other hand, an additional access control policy 12, user data R20 to which an object identifier R20 is assigned, and user data R21 to which an object identifier R21 is assigned, are stored. In the computer 1, a policy generating rule storing section 33, a user authentication section 30, and an additional access control policy generating section 31 are provided.

Figure 14B:
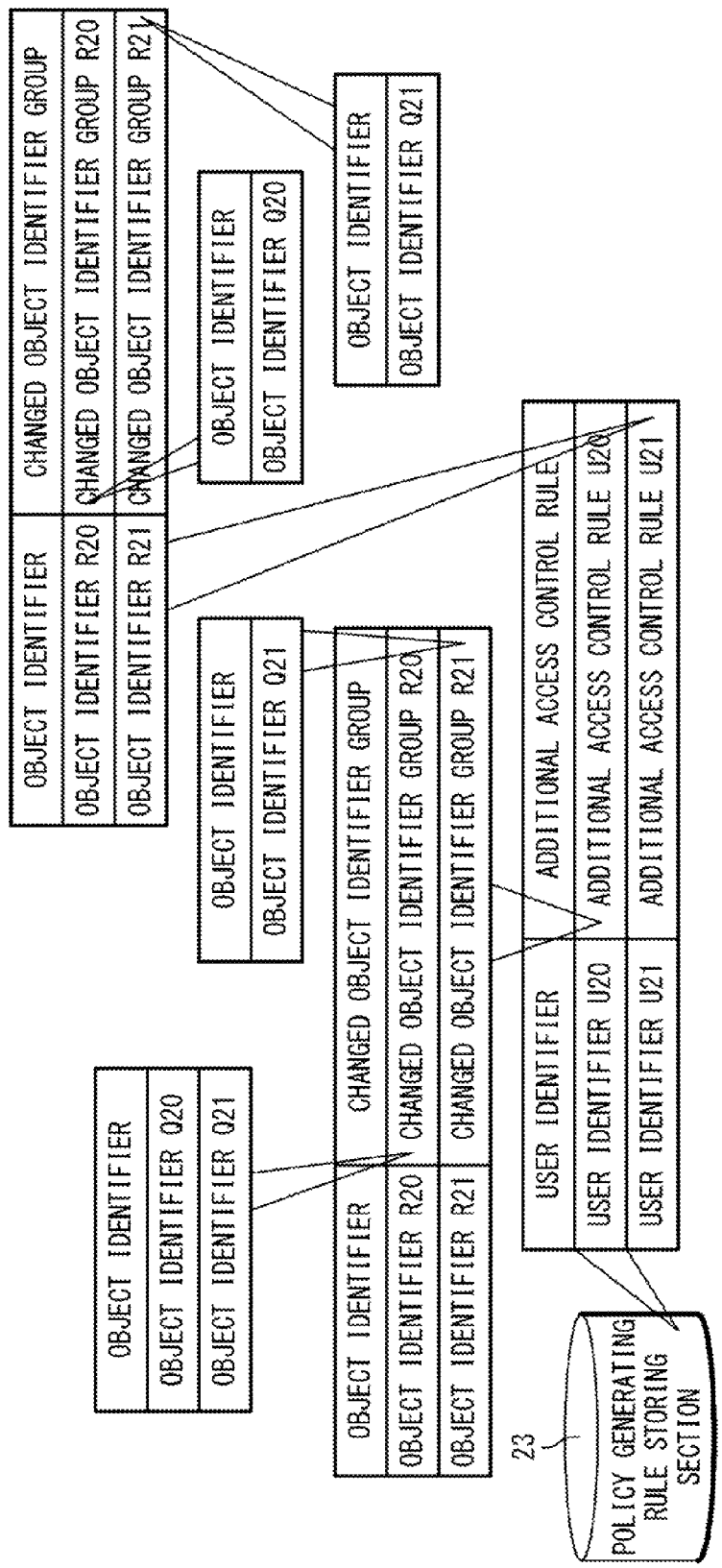
FIG. 14B is a conceptual diagram showing the content stored in a policy generating rule storing section.

FIG. 14B is a conceptual diagram showing the content stored in the policy generating rule storing section 23. As shown in FIG. 4B, in the policy. generating rule storing section 23, an additional access control rule U20 is assigned to the user identifier U20, and an additional access control rule U21 is assigned to the user identifier U21. In the additional access control rule U20, the object identifier R20 and the object identifier R21 are indicated. As a changed object identifier group R20, the object identifier Q20 and the object identifier Q21 are assigned to the object identifier R20. As a changed object identifier group R21, the object identifier Q21 is assigned to the object identifier R21. On the other hand, in the additional access control rule U21, the object identifier R20 and the object identifier R21 are indicated. As a changed object identifier group R20, the object identifier Q20 is assigned to the object identifier R20. As a changed object identifier group R21, the object identifier Q21 is assigned to the object identifier R21.

An operation method of the information processing system according to the present example will be described.

First, operation will he described in a case where the user U20 to which the user identifier U20 is assigned uses the computer 2. The user authentication section 30 of the computer 1 acquires the user identifier U20 of the user U20 from the OS 28 of the computer 2. The acquired user identifier U20 is sent to the additional access control policy generating section 31.

The additional access control policy generating section 31, after receiving the user identifier U20, refers to the policy generating rule storing section 33. Then the additional access control rule U20 is acquired which corresponds to the received user identifier U20. The content of the additional access control policy 12 is erased, and the additional access control rule U20 is stored as the additional access control policy 12.

Next, is assumed that the user process P20 managed by the OS 28 attempts "Read" for the user data R20 of the computer 1. The user process P20, in order to read the user data R20, sends a Read system call as a manipulation request, to the OS 28. The OS 28, after receiving the manipulation request from the user process P20, acquires the subject identifier P20 of the user process P20 and the object identifier R20 of the user data R20 that is a target. The subject identifier P20 and the object identifier R20 are added to the manipulation request to he notified to the access control section 26, as request information. Then the OS 28 waits for an access permitting signal or an access inhibiting signal.

The access control section 26, after receiving the request information, refers to the access control policy 27. It is then judged whether or not the access control rule R20 corresponding to the object identifier R20 is stored in the access control policy 27. Now in the access control policy 27, the access control rule R20 is not stored. Therefore, the access control section 26 notifies the access denial judging section 25 of that fact, together with the request information.

The access denial judging section 25, after receiving the request information, judges whether or not an object corresponding to the object identifier R20 is stored in the computer 1. Now in the computer 1, the user data R20 to which the object identifier R20 is assigned, is stored. Therefore, the access denial judging section 25 notifies that fact to the changed object determining section 24, together with the request information.

The changed object determining section 24, after receiving the request information, refers to the additional access control policy 12. As mentioned above, the content of the additional access control rule U20 is stored as the additional access control policy 12. The changed object determining section 24 acquires the changed object identifier group R20 to which the object identifier R20 is assigned. Then the changed object identifier group R20 is added to the request information to be sent to the access control rejudging section 23, as changed request information.

The access control rejudging section 23, after acquiring the changed request information, refers to the access control policy 27. The changed object identifier group R20 includes the object identifiers Q20 and Q21. Therefore, the access control rejudging section 23 refers to the access control rules (Q20 and Q21) which correspond to the object identifiers Q20 and Q21. It is then judged whether or not the subject identifier P20 and the manipulation content of the manipulation request are stored in the access control rules (Q20 and Q21). Now the subject identifier P20 and "Read" which is the content of the manipulation request, are stored in the access control policy 27. Therefore, the access control rejudging section 23 judges that the manipulation request is permitted and sends an access permitting signal to the OS 28. The OS 28, after receiving the access permitting signal, performs processing of "Read" for the user data R20 and sends a manipulation completing signal to the user process P20.

Next, operation will be described in a case where the user U21 of the user identifier U21 uses the computer 2. The user authentication section 30 of the computer 1 acquires the user identifier U21 of the user U21 who uses the computer 2, from the OS 28 of the computer 1. The user authentication section 30 sends the acquired user identifier U21 to the additional access control policy generating section 31.

The additional access control policy generating section 31, after receiving the user identifier U21, refers to the policy generating rule storing section 33. Then the additional access control rule U21 which corresponds to the received user identifier U21, is acquired. The additional access control policy generating section 31 erases the content of the additional access control policy 12 and newly stores the additional access control rule U21 as the additional access control policy 12.

Here, it is assumed that the user process P21 of the OS 28 attempts "Read" for the user data R20 of the computer 1. The user process P21 sends a Read system call as a manipulation request, to the OS 28 in order to read the user data R20. The OS 28, after receiving the manipulation request from the user process P21, acquires. the subject identifier P21 of the user process P21, and the object identifier R20 of user data R20 that is target. Then the subject identifier P21 and the object identifier R20 are added to the manipulation request to be sent to the access control section 26 as request information. The OS 28 then waits for an access permitting signal or an access inhibiting signal.

The access control section 26, after acquiring the request information, refers to the access control policy 27. It is then judged whether or not the access control rule R20 which corresponds to the object identifier R20, is stored in the access control policy 27. Now in the access control policy 27, the access control rule R20 is not stored. Therefore, the access control section 26 notifies the access denial judging section 25 of that fact, together with the request information.

The access denial judging section 25, after acquiring the request information, judges whether or not an object which corresponds to the object identifier R20, is stored in the computer 1. Now in the computer 1, the object (user data R20) which corresponds to the object identifier R20, is stored in the computer 210. Therefore, the access denial judging section 25 sends that fact to the changed object determining section 24, together with the request information.

The changed object determining section 24, after acquiring the request information, refers to the additional access control policy 12. As mentioned above, the content of the additional access control rule U21 is stored as the additional access control policy 12. The changed object determining section 24 acquires the changed object identifier group R20 (object identifier Q20) which corresponds to the object identifier R20. Then the acquired changed object identifier group R20 is added to the request information to be sent to the access control rejudging section 23, as changed request information.

The access control rejudging section 23, after acquiring the changed request information, refers to the access control policy 27. The access control rejudging section 23 then refers to the access control rule Q20 which corresponds to the object identifier Q20 included in the changed object identifier group R20. It is judged whether or not the manipulation content of the manipulation request is assigned to the subject identifier P21 in the access control rule Q20. Now in the access control rule Q20, the manipulation content (Read) of the manipulation request is not assigned to the subject identifier P21. Therefore, the access control rejudging section 23 judges that the manipulation request should be inhibited and sends an access inhibiting signal to the OS 28. The OS 28, after receiving the access inhibiting signal, sends a manipulation denying signal to the user process P21.

The present invention has been described above with the first and second embodiments and the examples 1 and 2. Note that the embodiments and the examples are not independent of each other, and can be combined within a range where contradiction does not occur.

The information processing system according to the present invention can be applied to a means of setting an access control rule. Here, as an information processing device used in the information processing system, a personal computer, an embedded computer such as a mobile communications terminal such as a cellular phone and a PDA, a game machine, and a multifunctional copier or the like can be used.

The present application claims priority based upon Japanese Patent Application No. 2009-034528, and the disclosure thereof is incorporated herein by reference.

The invention claimed is:

1. An information processing system, comprising:
a first information processing device configured to store a first object group; and
a second information processing device configured to receive a manipulation request indicating a content of manipulation for a manipulation target object from a subject to operate said manipulation target object based on said manipulation request,
wherein said second information processing device comprises:
an access control policy storing section configured to access an access control policy that indicates a relationship between each second object included in a second object group and a control rule indicating permitted manipulation content for said each second object; and
a data processing section configured to judge whether or not said manipulation request is feasible, wherein said first information processing device comprises:
an additional control policy storing section configured to indicate a changed object group with respect to each of first objects included in said first object group, wherein said changed object group is a group of said second objects to which same control rule as said each first object is applied, and
wherein said data processing section comprises:
a changed object group determination section configured to refer to said additional access control policy storing section when said manipulation target object is included in said first object group, and obtain said changed object group corresponding to said manipulation target object; and
an access control rejudging section configured to reference to said access control policy to judge whether or not said manipulation request is feasible for said each second object included in said changed object group and determine whether or not said manipulation request is feasible for said manipulation target object based on a judgment result,
wherein said data processing device further comprises an access control section configured to refer to said access control policy to judge whether or not said manipulation target object is included in said second object group, and
wherein said changed object group determination section obtains said changed object group when said manipulation target object is not included in said second object group.

2. The information processing system according to claim 1, wherein said second object group is a group of objects stored in said second information device.

3. The information processing system according to claim 1, wherein said data processing section further comprises an access denial judging section configured to judge whether or not said manipulation target object is included in said first object group, and
wherein said changed object group determination section obtains said changed object group when said manipulation target object is included in said first object group.

4. The information processing system according to claim 1, wherein said first information processing device further comprises:
a user authentication section configured to identify a user using said second information device; and
an additional access control policy generating section configured to change a content of said additional access control policy based on a judgment result of said user authentication section.

5. The information processing system according to claim 1, wherein said second information processing device comprises an infrastructure control section configured to execute processing for said manipulation target object based on said manipulation request, and
wherein said infrastructure control section obtains said manipulation request for said manipulation target object from a subject, notifies said data processing section of request information that includes information for identifying said subject, information for identifying said manipulation target object and said manipulation request, and determines whether or not manipulation for said manipulation target object is executed, based on a judgment result of said data processing section.

6. The information processing system according to claim 1, wherein said control rule includes an access control rule that indicates feasibility of access for an object.

7. The information processing system according to claim 1, wherein said control rule includes a rule concerning a used amount of resources for accessing to an object.

8. The information processing system according to claim 1, wherein said access control rejudging section refers to said access control policy, and judges whether or not said manipulation request is feasible, based on a rule that is a logical add of rules of objects included in said changed object group.

9. The information processing system according to claim 1, wherein said access control rejudging section refers to said access control policy, and judges whether or not said manipulation request is feasible, based on a rule that is a logical product of rules of objects included in said changed object identifier group.

10. A data saving device comprising a first information device used in an information processing device wherein said information processing device comprises:
the first information processing device configured to store a first object group; and
a second information processing device configured to receive a manipulation request indicating a content of manipulation for a manipulation target object from a subject to operate said manipulation target object based on said manipulation request,
wherein said second information processing device comprises:
an access control policy storing section configured to store an access control policy that indicates a relationship between each second object included in a second object group and a control rule indicating permitted manipulation content for said each second object; and
a data processing section configured to judge whether or not said manipulation request is feasible,
wherein said first information processing device comprises:
an additional control policy storing section configured to indicate a changed object group with respect to each of first objects included in said first object group, wherein said changed object group is a group of said second objects to which same control rule as said each first object is applied, and
wherein said data processing section comprises:
a changed object group determination section configured to refer to said additional access control policy storing section when said manipulation target object is included in said first object group, and obtain said changed object group corresponding to said manipulation target object; and
an access control rejudging section configured to reference to said access control policy to judge whether or not said manipulation request is feasible for said each second object included in said changed object group and determine whether or not said manipulation request is feasible for said manipulation target object based on a judgment result,
wherein said data processing device further comprises an access control section configured to refer to said access control policy to judge whether or not said manipulation target object is included in said second object group, and
wherein said changed object group determination section obtains said changed object group when said manipulation target object is not included in said second object group.

11. A data using device comprising a second information device used in an information processing device wherein said information processing device comprises:

a first information processing device configured to store a first object group; and the second information processing device configured to receive a manipulation request indicating a content of manipulation for a manipulation target object from a subject to operate said manipulation target object based on said manipulation request, wherein said second information processing device comprises:

an access control policy storing section configured to store an access control policy that indicates a relationship between each second object included in a second object group and a control rule indicating permitted manipulation content for said each second object; and a data processing section configured to judge whether or not said manipulation request is feasible, wherein said first information processing device comprises:

an additional control policy storing section configured to indicate a changed object group with respect to each of first objects included in said first object group, wherein said changed object group is a group of said second objects to which same control rule as said each first object is applied, and wherein said data processing section comprises:

a changed object group determination section configured to refer to said additional access control policy storing section when said manipulation target object is included in said first object group, and obtain said changed object group corresponding to said manipulation target object; and an access control rejudging section configured to reference to said access control policy to judge whether or not said manipulation request is feasible for said each second object included in said changed object group and determine whether or not said manipulation request is feasible for said manipulation target object based on a judgment result, wherein said data processing device further comprises an access control section configured to refer to said access control policy to judge whether or not said manipulation target object is included in said second object group, and wherein said changed object group determination section obtains said changed object group when said manipulation target object is not included in said second object group.

12. A method for operating an information processing system having a first information processing device configured to store a first object group, and a second information processing device configured to obtain manipulation request indicating a manipulation target object and a manipulation content to operate said manipulation target object based on said manipulation request, said method comprising:

preliminary storing an access control policy indicating a relationship between an each of second objects included in second object group and a control rule indicating permitted manipulations for said each second object, in said second information processing device;

preliminary storing an additional access control policy indicating a changed object group with respect to each of first objects included in said first object group in said first information processing device, wherein said changed object group is a group of second objects to which same control rule as said each first object is applied; and judging whether or not said manipulation request is feasible, wherein said judging whether or not said manipulation request is feasible comprises:

obtaining said manipulation request by said second information processing device;

referring to said additional access control policy and obtaining said changed object group corresponding to said manipulation target object by said second information processing device, when said manipulation request is included in said first object group; and referring to said access control policy to judge whether or not manipulation content of said manipulation request is feasible for said changed object group by said second information processing device, and judging whether or not said manipulation request is feasible for said manipulation target object, based on a judgment result, wherein said judging whether or not said manipulation request is feasible, further comprises referring to said access control policy to judge whether or not said manipulation target object is included in said second object group, and wherein said obtaining said changed object group comprises obtaining said changed object group when said manipulation target object is not included in said second object group.

13. The method according to claim 12, wherein said second object group is a group of objects stored in said second information processing device.

14. The method according to claim 12, wherein said judging whether or not said manipulation request is feasible, further comprises judging whether or not said manipulation target object is included in said first object group, and wherein said obtaining said changed object group, comprises obtaining said changed object group when said manipulation target object is included in said first object group.

15. The method according to claim 12, further comprising:

identifying a user who uses said second information processing device; and changing said additional access control policy based on a judgment result at said identifying.

16. The method according to claim 12, further comprising:

executing an operation for said manipulation target object, based on said manipulation request, and wherein said executing comprises, obtaining said manipulation request from a subject, notifying a data processing section of said manipulation request together with information for identifying said subject, and determining whether or not executing manipulation for said manipulation target object based on a judgment result of said data processing section.

17. The method according to claim 12, wherein said control rule includes an access control rule indicating feasibility of access for an object.

18. The method according to claim 12, wherein said control rule includes a rule concerning an amount of resources used for accessing to an object.

19. The method according to claim 12, wherein said judging whether or not said manipulation request is feasible, comprises referring to said access control policy to judge whether or not said manipulation request is feasible based on a rule that is a logical add of rules of objects included in said changed object group.

20. The method according to claim 12, wherein said judging whether or not said manipulation request is feasible, comprises referring to said access control policy to judge whether or not said manipulation request is feasible based on a rule that is a logical product of rules of objects included in said changed object group.

21. A non-transitory computer readable recording medium in which a computer-executable program code is stored to attain a method for operating an information processing system having a first information processing device configured to store a first object group, and a second information processing device configured to obtain manipulation request indicating a manipulation target object and a manipulation content to operate said manipulation target object based on said manipulation request, wherein said method comprises:

preliminary storing an access control policy indicating a relationship between an each of second objects included in second object group and a control rule indicating permitted manipulations for said each second object, in said second information processing device;

preliminary storing an additional access control policy indicating a changed object group with respect to each of first objects included in said first object group in said first information processing device, wherein said changed object group is a group of second objects to which same control rule as said each first object is applied; and judging whether or not said manipulation request is feasible, wherein said judging whether or not said manipulation request is feasible comprises:

obtaining said manipulation request by said second information processing device;

referring to said additional access control policy and obtaining said changed object group corresponding to said manipulation target object by said second information processing device, when said manipulation request is included in said first object group; and referring to said access control policy to judge whether or not manipulation content of said manipulation request is feasible for said changed object group by said second information processing device, and judging whether or not said manipulation request is feasible for said manipulation target object, based on a judgment result, wherein said judging whether or not said manipulation request is feasible, further comprises referring to said access control policy to judge whether or not said manipulation target object is included in said second object group, and wherein said obtaining said changed object group comprises obtaining said changed object group when said manipulation target object is not included in said second object group.

* * * * *